J. J. MORAND.
CUSHION WHEEL CONSTRUCTION.
APPLICATION FILED JAN. 5, 1922.
1,416,373.
Patented May 16, 1922.
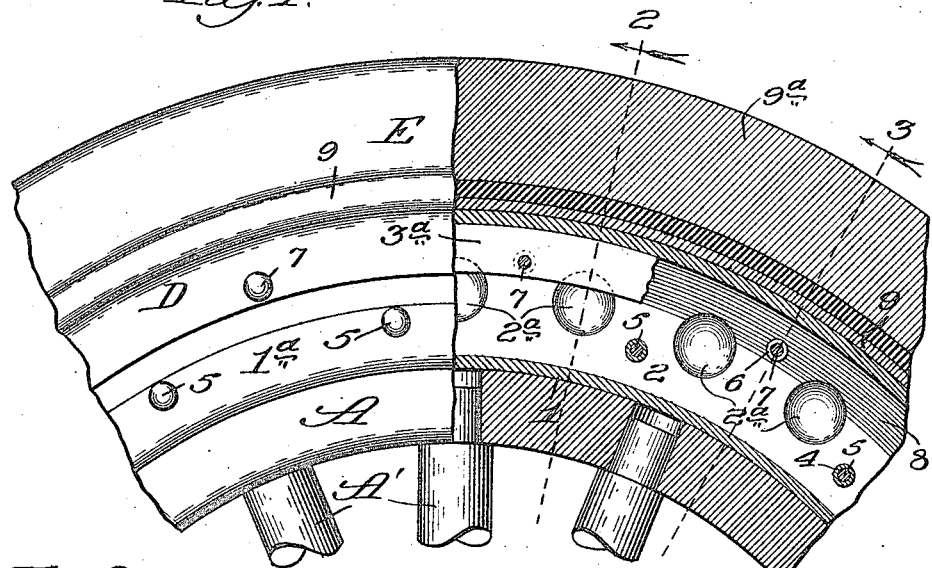
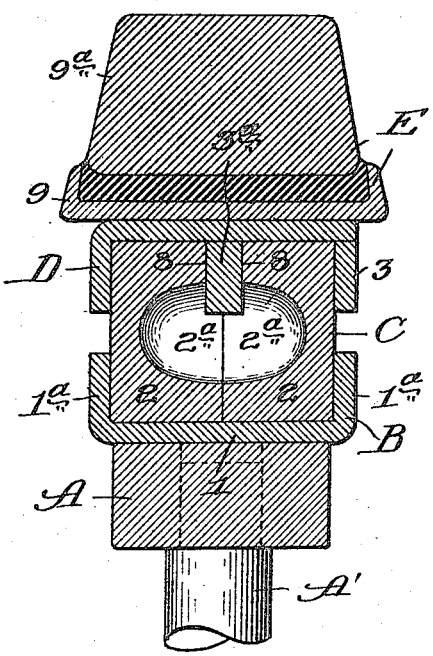
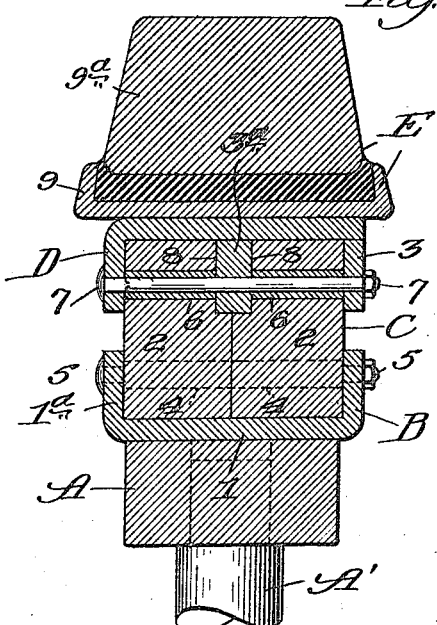
Inventor,
Joseph J. Morand,

UNITED STATES PATENT OFFICE.

JOSEPH J. MORAND, OF CHICAGO, ILLINOIS, ASSIGNOR TO MORAND CUSHION WHEEL CO., OF CHICAGO, ILLINOIS, A CORPORATION OF ILLINOIS.

CUSHION-WHEEL CONSTRUCTION.

1,416,373.                    Specification of Letters Patent.    Patented May 16, 1922.

Application filed January 5, 1922. Serial No. 527,089.

*To all whom it may concern:*

Be it known that I, JOSEPH J. MORAND, a citizen of the United States, residing at Chicago, in the county of Cook and State of Illinois, have invented a new and useful Improvement in Cushion-Wheel Construction, of which the following is a specification.

This invention relates particularly to cushion wheels adapted for use in connection with motor vehicles, and in analogous situations.

The primary object is to provide a more durable cushion wheel than has heretofore been known, making provision for distributing shocks throughout the circumference of the special cushion-element employed.

The invention is illustrated in its preferred embodiment in the accompanying drawing, in which—

Figure 1 represents a broken view of a cushion wheel construction embodying the invention, the view being partly in elevation and partly in section; Figure 2, a broken section taken as indicated at line 2 of Fig. 1; and Figure 3, a broken section taken as indicated at line 3 of Fig. 1.

In the construction illustrated, A represents the felly on a wheel supported by spokes A'; B, an inner annular channel-form cushion-rim mounted on the felly A; C, a two-part cushion-element whose inner circumferential portion is mounted in and secured to the inner cushion-rim B; D, an outer channel-form cushion-rim which receives and has firmly secured therein the outer circumferential portion of a cushion-element C; and E, a tire mounted on the outer cushion-rim D.

The inner cushion-rim B preferably comprises an integral annular steel member of channel form cross-section, which is shrunk on the felly, the rim having the felly embracing portion 1 and the outwardly-extending side flanges 1ª.

The cushion-element C comprises two annular elastic rubber cushion-members 2 which are provided at their inner or adjacent sides with annular series of recesses 2ª.

The outer cushion-rim D preferably comprises a channel-form member having one of its side flanges 3 removable. Also, the outer rim D is preferably provided with an intermediate ring or flange 3ª which serves as a reenforcing rib.

The cushion members 2 are provided with inner annular series of perforations which register with each other and which have inserted therein metal spacing sleeves 4. The perforations register with perforations in the flanges 1ª of the inner cushion-rim, and the cushion members are secured to the flanges of the inner cushion rim by means of a series of bolts 5. The spacing sleeves 4 abut against each other at their inner ends and abut against the flanges 1ª at their outer ends.

The cushion members 2 are further provided in their outer circumferential portions with series of perforations in which are contained spacing sleeves 6. These spacing sleeves are disposed between the central rib 3ª and the side flanges of the outer cushion-rim. Bolts 7 serve to secure the outer circumferential portions of the cushion members 2 to the flanges of the outer cushion-rim and to the intermediate reenforcing ring 3ª.

The recesses 2ª are of circular contour, as shown in Fig. 1; and the inner series of bolts 5 are staggered with relation to the outer series of bolts 6, as appears from Fig. 1. According to this arrangement the outer series of bolts 7 are arranged outside of the series of recesses 2ª and in alternate spaces between said recesses; and the series of bolts 5 are arranged inside of the recesses 2ª and in the other alternate spaces between the recesses. This arrangement serves to avoid any undue weakening of the rubber cushion members at any point, and gives the best disposition of the rubber to avoid possible danger of tearing.

The rubber cushion members 2 are provided at the inner sides of their outer circumferential portions with complemental annular recesses 8 which serve to accommodate the reenforcing ring 3ª.

Each of the rubber cushion members 2 is preferably molded in the form of a complete annulus, the bushings or spacing sleeves being molded in the rubber members and vulcanized therein. In the assembling operation, the rubber members may be stretched over the side-flanges of the inner cushion-rim.

The tire E comprises a flanged steel band 9 and a rubber tread 9ª vulcanized thereto. In the assembling operation the tire is forced onto the outer cushion-rim, under a pressure of many tons, so that the outer cushion-rim is, in effect, firmly secured within the steel band of the tire.

In the operation of the improved wheel, when the wheel encounters an obstruction in the road the shock occasioned thereby is distributed throughout the circumference of the cushion-element and thereby dissipated. In accomplishing its function, the cushion-element acts under compression at some portions and under distention at other portions, the resistance to deformation of the wheel occurring throughout the entire circumference of the wheel.

What I regard as new, and desire to secure by Letters Patent, is:

1. A cushion wheel construction comprising an inner annular channel-form rim and an outer annular channel-form rim, said rims being separated by an annular space and having their flanges extending towards each other; an interposed two-part cushion-element comprising two annular elastic rubber cushion members provided at their inner surfaces with recesses of circular contour, each cushion-element being provided with an outer series of bushings and an inner series of bushings which are staggered with relation to each other and with relation to said recesses; an outer series of bolts extending through the outer bushings and through the flanges of the outer cushion-rim; and an inner series of bolts extending through the inner series of bushings and through the flanges of the inner cushion-rim.

2. A cushion wheel construction comprising an inner annular channel-form rim and an outer annular channel-form rim, said rims being separated by an annular space and having their flanges extending towards each other; an interposed two-part cushion-element comprising two annular elastic rubber cushion members having their inner surfaces provided with series of recesses of circular contour; an outer series of bolts securing the outer circumferential portions of said cushion members to the flanges of the outer cushion-rim; and an inner series of bolts securing the inner circumferential portions of said cushion members to the flanges of the inner cushion-rim, the inner and outer series of bolts being staggered with relation to each other and with relation to said recesses.

3. A cushion wheel construction comprising an inner annular channel-form rim and an outer annular channel-form rim, said rims being separated by an annular space, and having their flanges extending towards each other, one of the flanges of the outer rim being removable; an intermediate reenforcing ring in said outer rim; an interposed two-part cushion-element comprising two annular elastic rubber cushion members, said cushion members having annular recesses accommodating said intermediate ring; an outer series of bushings in each cushion member interposed between the intermediate ring and a side flange of the outer cushion-rim, inner series of bushings in said cushion members abutting against each other at their inner ends and abutting against the flanges of the inner cushion-rim at their outer ends, said cushion members being provided at their inner surfaces with registering recesses of circular contour and the outer and inner series of bushings being staggered with relation to each other and with relation to said recesses; and outer and inner series of bolts extending through said bushings and securing said cushion members to the flanges of said cushion-rims.

JOSEPH J. MORAND.